United States Patent [19]
Clifton

[11] Patent Number: 5,469,556
[45] Date of Patent: Nov. 21, 1995

[54] RESOURCE ACCESS SECURITY SYSTEM FOR CONTROLLING ACCESS TO RESOURCES OF A DATA PROCESSING SYSTEM

[75] Inventor: Daniel B. Clifton, Melbourne, Fla.

[73] Assignee: Harris Corporation, Melbourne, Fla.

[21] Appl. No.: 972,510

[22] Filed: Nov. 6, 1992

Related U.S. Application Data

[63] Continuation of Ser. No. 449,677, Dec. 12, 1989, abandoned.

[51] Int. Cl.$^6$ .............................. G06F 12/14; G06F 11/30
[52] U.S. Cl. .................... 395/490; 395/186; 364/DIG. 1
[58] Field of Search .................................. 395/400, 425, 395/575

[56] References Cited

U.S. PATENT DOCUMENTS

| | | |
|---|---|---|
| 4,079,453 | 3/1978 | Dahl . |
| 4,092,715 | 5/1978 | Scriver . |
| 4,155,119 | 5/1979 | De Ward et al. . |
| 4,177,510 | 12/1979 | Appell et al. ............................. 395/425 |
| 4,300,192 | 11/1981 | Couleur et al. . |
| 4,355,355 | 10/1982 | Butwell et al. . |
| 4,382,542 | 5/1982 | Anastas et al. ........................... 395/425 |
| 4,442,484 | 4/1984 | Childs, Jr. ................................. 395/400 |
| 4,447,874 | 5/1984 | Bradley et al. ........................... 395/425 |
| 4,456,954 | 6/1984 | Bullions, III et al. . |
| 4,654,777 | 3/1987 | Nakamura . |
| 4,669,043 | 5/1987 | Kaplinsky . |
| 4,713,753 | 12/1987 | Boebert et al. ........................... 395/575 |
| 4,777,589 | 10/1988 | Boettner et al. ......................... 395/400 |
| 4,809,160 | 2/1989 | Mahon et al. ............................ 395/575 |
| 4,858,117 | 8/1989 | DiChiara et al. . |
| 4,926,322 | 5/1990 | Stimac et al. . |
| 4,972,338 | 11/1990 | Crawford et al. . |
| 4,979,098 | 12/1990 | Baum et al. ............................. 395/400 |
| 5,008,811 | 4/1991 | Scalzi et al. ............................. 395/400 |
| 5,023,777 | 6/1991 | Sawamoto ............................... 395/400 |
| 5,140,684 | 8/1992 | Sakamura et al. ....................... 395/425 |
| 5,146,575 | 9/1992 | Nolan, Jr. ................................. 395/425 |
| 5,201,043 | 4/1993 | Crawford et al. ....................... 395/575 |

OTHER PUBLICATIONS

Carroll, J. M. "Implementating Multilevel Security by Violation Privilege", Computers & Security, 7 (1988) pp. 563–573.

Primary Examiner—Jack B. Harvey
Assistant Examiner—Michael A. Whitfield
Attorney, Agent, or Firm—Charles Wands

[57] ABSTRACT

A resource access security system for use in a data processing system for controlling access to resources correspondingly assigned to addresses in an address space of the data processing system by the use of descriptors. The descriptors correspondingly identify the resources and access to the resources is controlled by requiring the input of a descriptor of the resource to which access is sought. The resource access security system controls access to the resources by translating each descriptor being taught to gain access to a resource by use of a plurality of tables having stored therein user/job information, domain information and page information and a descriptor translator which controls the descriptor translation process. The descriptors are virtual addresses of addresses assigned to the resources of the data processing system.

16 Claims, 6 Drawing Sheets ns: 5,469,556

RESOURCE ACCESS SECURITY SYSTEM FOR CONTROLLING ACCESS TO RESOURCES OF A DATA PROCESSING SYSTEM

This is a continuation of application Ser. No. 07/449,677, filed Dec. 12, 1989, now abandoned.

FIELD OF THE INVENTION

The present invention relates to data processor security systems for controlling access to data of a data processor according to a security scheme. More particularly, the present invention relates to a resource access security system which controls access to both processes and data by the use of descriptors which identify each of the processes and data.

BACKGROUND OF THE INVENTION

The sharing of the resources including hardware, software, and data in the form of a data base of a large data processing system offers great efficiencies to users of such systems. However, an undesired characteristic of the sharing of resources in such systems is that important data may be destroyed or secret or confidential data may be compromised. Further, in some processing environments there is a need to handle data of multiple security levels which requires screening access to sensitive data by matching user clearance level to the security levels.

Generally, data processor security systems control the flow of information by using a combination of hardware and software protection mechanisms. The role of hardware and software protection mechanisms is two-fold. First, they enforce the access controls, governing the resources of the data processing system thereby implementing the security policy of the installation having the computer. This security policy may be based on the concept of data classification levels. Second, they control a user's ability to perform certain functions known as trusted processes. These processes perform critical system administrative duties and should only be run under controlled conditions.

A commonly known conventional data processor security system is one in which the identity or pass-word of the user is confirmed through appropriate operations at a terminal before a process requested by the user is initiated or before access to the requested data is permitted.

Another commonly known conventional data processor security system similar to the one described above is one in which a mutual data transfer is performed between a host computer and a terminal to identify the terminal/user in precedence to initiating the requested process. This conventional system requires that identification data be previously stored in memories or switch circuits of the host computer and the terminals connected thereto, and that identification data be mutually exchanged between the host computer and a terminal when a request for data access is issued by the terminal. When a coincidence is recognized between the exchanged identification data, communication is allowed to be established between the host computer and the terminal.

The above described conventional systems which make use of identification data to identify either the user or a terminal connected to a host computer suffers from various disadvantages. For example, access to data in the computer by a user with a valid identification is not limited in any way. The user applying the valid identification attains access to all of the data and devices in the computer without discrimination. Further, the system does not fully provide both hardware and software protection mechanisms to perform the two-fold function described above.

A further conventional data processor security system makes use of a privilege ring architecture to implement the two-fold function described above. Trusted processes and the most sensitive data are assigned to the ring of highest privilege, while less sensitive data and less trusted processes are assigned to rings of lower privilege. This conventional data processor security system, however, complicates security, since a single hardware mechanism enforces both the access control and the trusted process control of the two-fold function described above.

Further, the above described conventional data processor security system provides a large number of avenues to obtain access to data in the most privileged computer state. For example, to provide access to a trusted process in the ring of highest privilege, access to all sensitive data in the ring of highest privilege must also be provided. Likewise, to provide access to sensitive data in the highest ring of privilege, access to all trusted processes in the highest ring of privilege must also be provided. Also, in the conventional data processor security system described above, a single security breach often results in a complete compromise of the system.

SUMMARY OF THE INVENTION

The present invention provides a resource access security system for controlling access to resources including hardware, software, input/output ports and data in the form of databases of a data processing system by the use of descriptors which identify the resources.

Particularly, the present invention makes use of orthogonal protection mechanisms to separate the two-fold function described above. Namely, trusted process control is separated from access control. This separation allows a computer to increase the number of privilege levels without increasing the number of clearance levels. Thus, by use of the present invention, a user or a job may have the privilege of executing any one or a combination of trusted processes corresponding to higher privilege levels while being unable to access resources assigned to higher classification levels. Likewise, a user or a job may have clearance to access resources assigned to higher classification levels, while being unable to execute trusted processes corresponding to higher privilege levels.

The orthogonal protection mechanisms as used in the present invention operate, for example, in a data processing system having resources A, B, C, and D which are classified in clearance levels confidential, secret, secret, and top secret, respectively. The orthogonal protection mechanisms of the present invention in this example can be designed to allow a user or job the privilege of only accessing resources A, B and D but not C even though the user or job has a clearance of top secret.

Further, in the present invention, by use of the orthogonal protection mechanisms, a user or job may have the privilege of performing certain processing operations on a particular portion of a set of data without permitting access to the remaining portion of the set of data or having the necessary clearance for the data.

Therefore, in the present invention, classified and sensitive data remain inaccessible from all but a few processes designed specifically to handle the data. At the same time in the present invention, a process can be given access to highly classified data without also giving it the ability to perform functions normally reserved to trusted processes. Thus, in the present invention, security validation is facilitated, since a fewer number of avenues are provided to the most privileged computer state. Also, by use of the present invention, the dynamic security of the data processing system is increased since the most privileged computer state can be designed to not access sensitive classified data.

To implement the orthogonal protection mechanisms of the present invention, all resources in the system including software, data in the form of databases, input/output ports connected to terminals, printers, external memories (disk drives), and hardware such as cache memory, internal memory or the like, are assigned a privilege level in addition to a classification level by use of descriptors. These descriptors each identify a resource and include information related to the privilege level, classification level, and address of the resource in the address space of the data processing system.

In the present invention, all resources needed to perform specific functions are organized into a domain which corresponds to a privilege level. Information identifying the domain to which the resource belongs is included in the descriptor. Also, as described above, each resource is assigned a classification level by organizing the resources into pages which correspond to the classification levels. Information identifying the classification level and page to which the resource belongs is included in the descriptor. Classification levels are not only assigned to software resources such as processes and databases, but also to input/output ports, and hardware such as terminals, printers, disk drives, etc.

The descriptor also includes information identifying an address in the address space to which the resource is assigned.

Essentially, the descriptor described above, including information identifying the domain, page and address of the resource in the address space of the data processing system, forms a virtual address of the resource. Thus, in the present invention, when a descriptor is used to access a particular resource, the descriptor must be translated by a descriptor translator to obtain the real address assigned to the resource in the address space of the data processing system.

Therefore, the present invention provides a resource access security system to be used in a data processing system for controlling access to resources correspondingly assigned to addresses in an address space of the data processing system by the use of descriptors. The descriptors correspondingly identify the resources. Access to the resources is controlled by requiring the input of a descriptor corresponding to the resource to which access is sought and translating the descriptor so that only the address assigned to the resource in the address space of the data processing system is accessed.

The resource access security system of the present invention performs the translation of a descriptor by use of a user/job information table, including a plurality of user/job entries, each having stored therein a user/job pointer which points to a base address of a domain table to which the user/job has the privilege of access, a plurality of domain tables, each including a plurality of domain entries, wherein each domain entry has stored therein a domain pointer which points to a base address of a page table and a plurality of page tables, each having a plurality of pages wherein each page has stored therein a base address of a resource in the address space of the data processing computer to which access is sought.

The user/job table referenced above is used to obtain user/job information related to the requested resource and related to the user or job seeking access to the resource. The user/job information points to a domain table containing the privilege levels or domains to which the user or job has the privilege of access. The domain tables are used to obtain the particular domain or privilege level of the user or job. The page tables are used to obtain the page of resources included in the identified domain.

Also included in the present invention is decoding means for decoding an instruction to be executed by the data processing system to determine whether the instruction is an instruction for accessing a resource. If the instruction is an instruction for accessing a resource, the decoding means obtains from external memory, or a register internal to the data processing system, an operand associated with the instruction, wherein the operand is a virtual address or descriptor identifying the resource.

A descriptor translating means is provided in the present invention for translating the descriptor obtained by the decoding means by using the user/job table, domain table and page table to thereby determine an address within the address space of the data processing system assigned to the resource to which access is sought. Thus, by use of the present invention, access is only permitted to the resource identified by the user/job, domain and page information.

The user/job, domain and page information is also stored in a register in the data processing system of the present invention and is used to temporarily set the data processing system to the privilege and classification or clearance level of the user or job to thereby disallow access to other resources having a higher classification level. In addition, writing to resources with a lower classification level is also prevented by use of this stored information.

BRIEF DESCRIPTION OF THE DRAWINGS

The features of the invention which are believed to be novel are set forth with particularity in the appended claims. The invention may be best understood, however, by reference to the following description in conjunction with the accompanying drawings in which:

DETAILED DESCRIPTION

Figure 1:
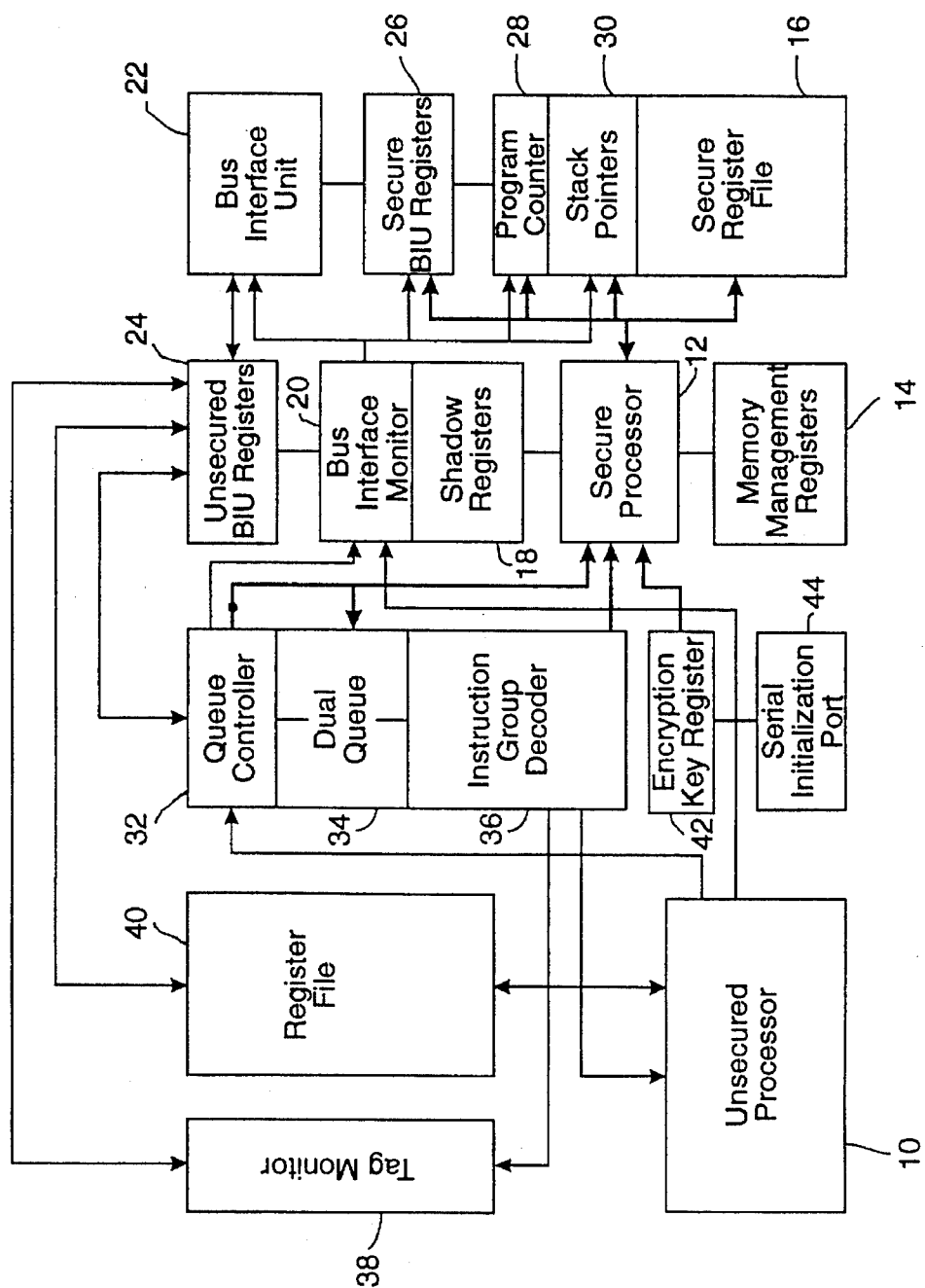
FIG. 1 is a schematic diagram of the resource access security system and the data processing system of the present invention.

FIG. 1 illustrates the resource access security system and the data processing system of the present invention. The total system shown in FIG. 1 provides a high degree of security by establishing as much process containment as is feasibly possible. Particularly, the present invention provides a separation of processor privilege levels from data classification levels by the use of descriptors which identify the resources of the data processing system.

In the present invention, the resources are assigned to one of, for example, four classifications, which correspond to clearance levels. The clearance levels may be unclassified, classified, secret and top secret. The classifications are arranged in hierarchical order of sensitivity so that inclusion of a classification implies inclusion of all classifications of lower sensitivity. The resources are also assigned to one or more of, for example, three privilege levels of the data processing system. The privilege levels are also arranged in hierarchical order.

Each user of the data processing system of the present invention is assigned a clearance level which corresponds to a classification, and each user is also assigned to one or more domains which define those resources to which the user has the privilege of access. Thus, in the present invention, the total access rights of a user are defined by the intersection of his clearance level and privileges. All access to the resources of the data processing system of the present invention are controlled by the resource access security system of the present invention. The present invention may also control access to some of the resources by the use of access lists containing identification information of all users that have access permission to a particular domain.

Specifically, as shown in FIG. 1, the present invention includes an unsecured processor 10 and a secure processor 12. The unsecured processor 10 executes all unsecure instructions, and the secure processor 12 executes all secure instructions. The secure instructions include privileged instructions which access a resource to which access is controlled by the resource access security system of the present invention. Unsecured instructions are normal processing instructions for processing data internal to the data processing system. The secure processor 12 is connected to memory management registers 14, secure register file 16, and shadow registers 18. A bus interface monitor 20 is provided for checking the validity of every access to resources (not shown) of the data processing system. The bus interface monitor 20 is connected to bus interface unit (BIU) 22, unsecured BIU registers 24, secure BIU registers 26, program counter 28, stack pointers 30, queue controller 32 which is connected to a queue 34, unsecured processor 10, and shadow registers 18. BIU 22 is also connected to the resources of the data processing system.

The memory management registers 14 are used to hold descriptor information of resources to which the data processing system presently has access. The secure register file 16 includes general purpose registers used by the secure processor 12 for storing and processing data. Shadow registers 18 holds the results of virtual to real address translations, classification tags, and access information of the resources of the data processing system of the present invention. The stack registers 30 hold a virtual address pointing to data of a domain (privilege level) page (classification) and offset of a resource in the memory of the data processing system of the present invention. The domain, page, and offset will be described in more detail below. Program counter 28 holds the virtual address of the next instruction to be executed.

The bus interface monitor 20, in response to control signals from the unsecured processor 10, queue controller 32, or the secure processor 12, validates the appropriate bus operations to the resources through the bus interface unit 22 by use of data in the shadow registers 18.

An instruction group decoder 36 is connected to the unsecured processor 10 and the secure processor 12. The instruction group decoder 36 is provided for decoding instructions to be executed by the data processing system to determine whether the instruction to be executed is a secure instruction or an unsecured instruction. If the instruction is a secure instruction, then the instruction is transferred to the secure processor 12 for execution. If the instruction is an unsecured instruction, then the instruction is transferred to the unsecured processor 10 for execution. Instructions are queued to the instruction group controller 36 through a queue 34 by the queue controller 32. The queue controller 32 is connected to the secure processor 12, and the bus interface monitor 20 and performs an instruction prefetch operation whenever the number of instructions in the queue drops to a specified number.

As described above, queue controller 32 operates to perform a prefetch of instructions and associated operands through bus interface monitor 20. The prefetched instructions are stored in the queue 28. The instruction group decoder 36 fetches an instruction from the queue 34 and decodes the instruction to determine whether the instruction is a secure instruction or an unsecured instruction. Depending upon the type of instruction, operands are fetched either from the queue 34, the register file 40, the secure register file 16, or an external resource. If one of the operands is fetched from an external resource, its virtual address is fetched from either the queue 34, the register Files 40, 16, or the stack pointers 30. As indicated above, if the instruction is a secure instruction, the instruction is transferred to the secure processor 12, and if the instruction is an unsecured instruction, the instruction is transferred to the unsecured processor 10. The unsecured processor 10 operates in response to instructions transferred from the instruction group decoder 36. The instructions transferred from the instruction group decoder 34 are decoded by the unsecured processor 10 to determine the particular operation sought by the instruction. Thereafter, the unsecured processor 10 operates in response to the instruction transferred from the instruction group decoder 36 to perform the indicated operation. The secure processor 12 operates in response to instructions transferred from the instruction group decoder 36. The instructions transferred from the instruction group decoder 36 are decoded by the secure processor 12 to determine the operation indicated thereby and whether access to a resource is being sought. Thereafter, the secure processor 12 performs the operation indicated by the instruction and any descriptor translations so as to control access to the resources of the data processing system.

A tag monitor 38 is provided for maintaining classification tags of data stored in register file 40. Register file 40 includes general purpose registers used by the unsecured processor 12 for storing and processing data. The unsecured processor 10 being connected to the register file 40 processes data in register file 40.

The present invention also provides for a special initialization procedure which requires the input of an encryption key to release the processor from an initial limited processing state. This feature is provided by the encryption key register 42 and serial initialization port 44. The serial initialization port 44 is connected to the encryption key register 42 which is connected to the secure processor 12.

The data processing system of the present as shown in FIG. 1 has three privilege states, all of which are independent of data classification levels. The three states are the application state, the exception state, and the supervisor state. The application state is provided for application processes and provides no special privileges to the user or job. The exception state is intended for exception handlers and other utilities requested by a user or job and does not provide any special privileges other than the ability to clear the interrupt flag and process the return-from-exception-state and the jump-to-supervisory-state instructions. The supervisor state is designed to contain the operating system kernel (implemented in software) of the data processing system and allows the execution of privileged instructions. With the exception of a halt instruction, these privileged instructions allow the loading of critical management and control registers of the data processing system of the present invention.

All secure instructions including privileged instructions are handled by the secure processor 12. The secure processor also updates the appropriate stack pointer of the stack pointers 30 after any stack operation. In addition, the secure processor 12 executes several unprivileged instructions when the data processing system is in either the exception or supervisor state. These additional instructions include load and store operations, input and output operations, add, subtract, compare, and logical operations of AND, OR, and XOR. These instructions are executed by the secure processor in order to provide security in such critical areas as memory management and the loading and subsequent execution of critical procedures. The secure processor 12 also executes all jump instructions, particularly those defining a jump to a domain or a return from a domain.

In the present invention, when data is transferred to the register file 40 from an external resource, a classification tag is used by the tag monitor 38 to maintain classification level identification of the data. Conversely, when data is transferred from the register file 40 to an external resource, the classification tag is used by the bus interface monitor 20 to ensure that the data is not written to a resource with a lower classification level. Particularly, data from the tag monitor 38 and the register file 40 is first transferred to the unsecured BIU registers 24, and then to memory, and vice-versa. The secure BIU registers 26 being connected to the bus interface monitor 20 and the bus interface unit 22 inputs and receives data to and from the secure processor 12, secure register file 16, the stack pointers 30, the queue controller 32, and the program counter 28. The bus interface unit 22 inputs and outputs data to and from the resources assigned to addresses in the address space of the data processing system of the present invention.

Control of access to the resources of the data processing system is controlled by the bus interface monitor 20. The bus interface monitor 20 responds to signals from the queue controller 32, the unsecured processor 10 and the secure processor 12. Depending upon the source of the control signal, the bus interface monitor 20 fetches a virtual address from either the queue controller 32, the unsecured processor 10 or the secure processor 12, or one of the stack pointers 30. The virtual address identifies the resource being accessed. The bus interface monitor 20 applies the virtual address to entries in the shadow registers 18 to determine whether information related to the virtual address, from a previous translation is stored therein. If information related to the virtual address is found in the shadow registers 18, then the bus interface monitor 20 also checks the shadow registers 18 for access permission information. Thus, if access is permitted, then the real address stored in the shadow register 18 related to the virtual address is transferred to the bus interface unit 22 and a bus cycle is initiated. The shadow registers 18 as indicated above are used to store data of previous translations of virtual addresses in order to speed the translation process by eliminating the need to perform another translation process when the virtual address of concern has been previously translated.

Figure 2:
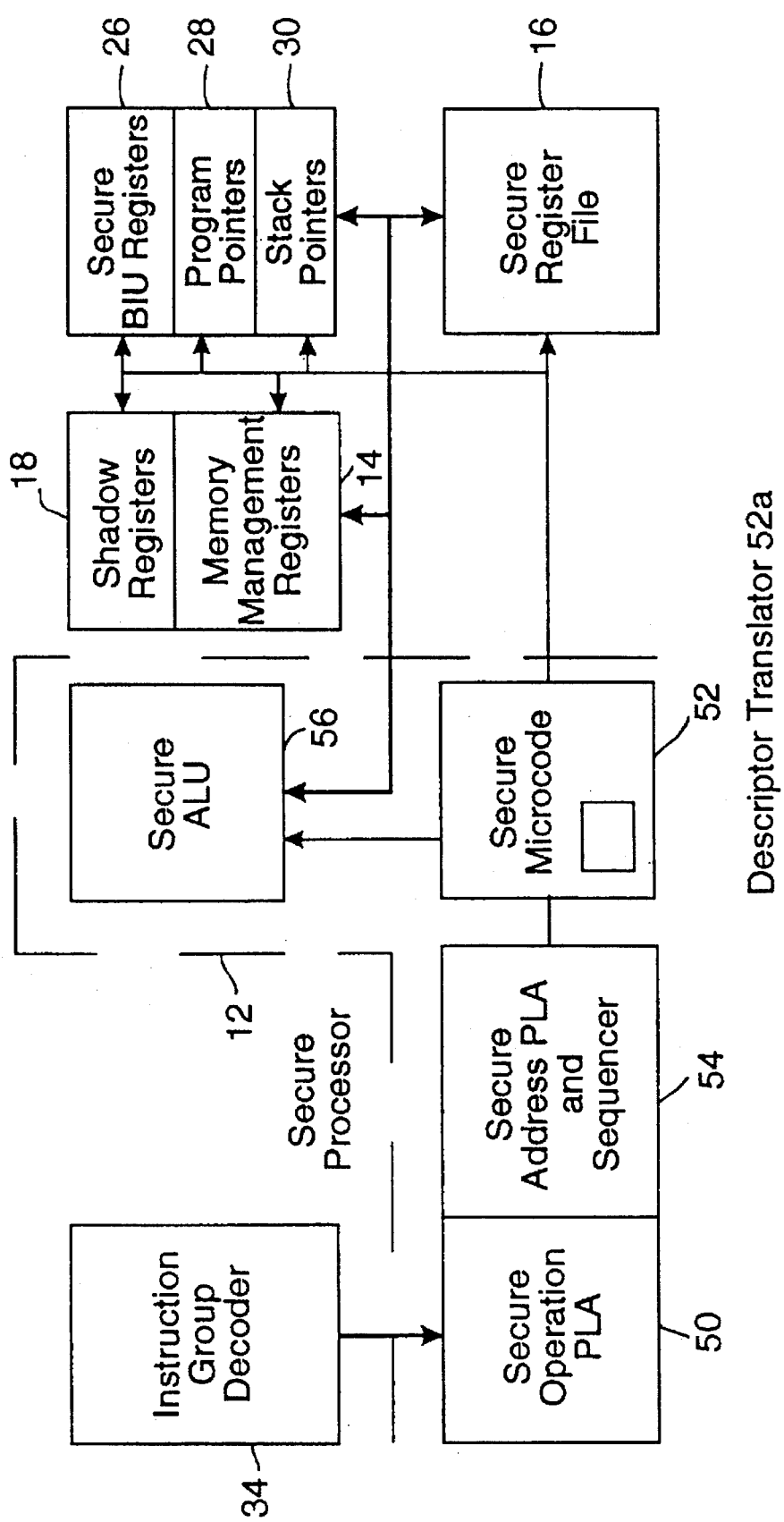
FIG. 2 is a schematic diagram of the secure processor of the present invention.

As described above, the tag monitor 38 is used to maintain the classification tags of data in the register file 40 to insure they are updated properly after each operation. Also, if data in the register file 32 is moved, its new location is tagged with the same classification as before by the tag monitor 38. The secure processor 12 shown in greater detail in FIG. 2 includes a secure operation decoder 50, secure microcode 52, secure microcode address generator and sequencer 54, and secure arithmetic logic unit (ALU) 56. The secure microcode 52 includes a descriptor translator module 52a for translating a descriptor (virtual address) of a resource to a real address.

Instructions from the instruction group decoder 36 are sequentially input to the secure operation decoder 50 and decoded thereby. Control signals are then supplied from the secure operation decoder 50 to the secure address generator and sequencer 54 which supplies sequentially generated addresses to the secure microcode 52 related to the operation indicated by the control signals in order to obtain the appropriate microcode subroutine. If a secure instruction which seeks access of a resource is decoded, then the descriptor translator module 52a is addressed by the secure address generator and sequencer. Control signals from the secure microcode 52 are applied to the secure arithmetic logic unit 56, secure register file 16, secure information register file 17 stack pointers 30, program counter 28, secure BIU registers 26, memory management registers 14, and shadow registers 18 in order to control the operations performed thereby.

The secure processor 12 makes use of the secure register file 16 for general storing processing operation. As described above, the secure register file 16 includes a plurality of registers. The secure ALU 56 performs functions on any two of the registers of the secure register file 16 such as add, subtract, compare, OR, XOR, and AND. Any of the registers of the secure register file 16 can also be rotated one bit to the left or right by the secure ALU 56. In addition to the secure register file 16, the secure processor 12 also has access to a plurality of memory management registers 14 which contain the system and global root pointers and limit values, the virtual address of the current domains being accessed, their descriptor table root pointers and limit data, and the identification and classification and clearance level of the current user/job. The system and global root pointers and limit values are described below.

Figure 3:
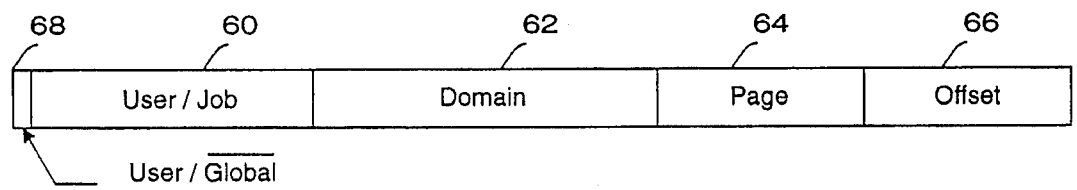
FIG. 3 illustrates the format of a descriptor of the present invention.

As described above, the present invention implements the resource access security control by implementing a virtual addressing system whereby each resource of the data processing system is identified by a descriptor which is a virtual address thereof. In order to access a particular resource by use of the present invention, the descriptor must be input by the user or job in association with an instruction and translated to obtain the real address of the resource. A descriptor as shown in FIG. 3 includes offset information identifying a user/job 60, offset information identifying a domain 62, offset information identifying a page 64, and offset information identifying the offset of an address 66. User/global information 68 is also included in the descriptor for identifying when a user or global access is being sought. A global access being an access not constrained by the particular user or job seeking access.

The user/job offset information 60 identifies the particular user or job requesting access to the resource. In the present invention, the resource of the data processing system including data, software, input/output ports, memory, and external devices are organized in domains in order to perform particular functions. Each user or job is given the privilege of accessing certain domains. Thus, the domain offset information 62 identifies the domain to which the user or job identified by the user/job information 60 has the privilege of access.

The resources are also organized into pages which correspond to the clearance levels or classifications of the data processing system, which may be, for example, unclassified, classified, secret and top secret. Thus, the page offset information 64 provides information identifying the page to which the resource belongs. The address offset information 66 provides an offset to an address in the address space assigned to the resource to which access is requested. The descriptor shown in FIG. 3 essentially is a virtual address of the resource in the address space of the data processing system. Access to the resources is controlled by assigning each of the resources to a descriptor. In order to gain access to a resource, the appropriate descriptor must be applied. The descriptor being applied is translated by the descriptor translator module 52a in order to obtain the real address of the resource.

Tables are provided in the present invention in order to aid in performing the descriptor translation process performed by the descriptor translator module 52a. The tables are stored in a memory (resource) of the data processing system.

Figure 4:
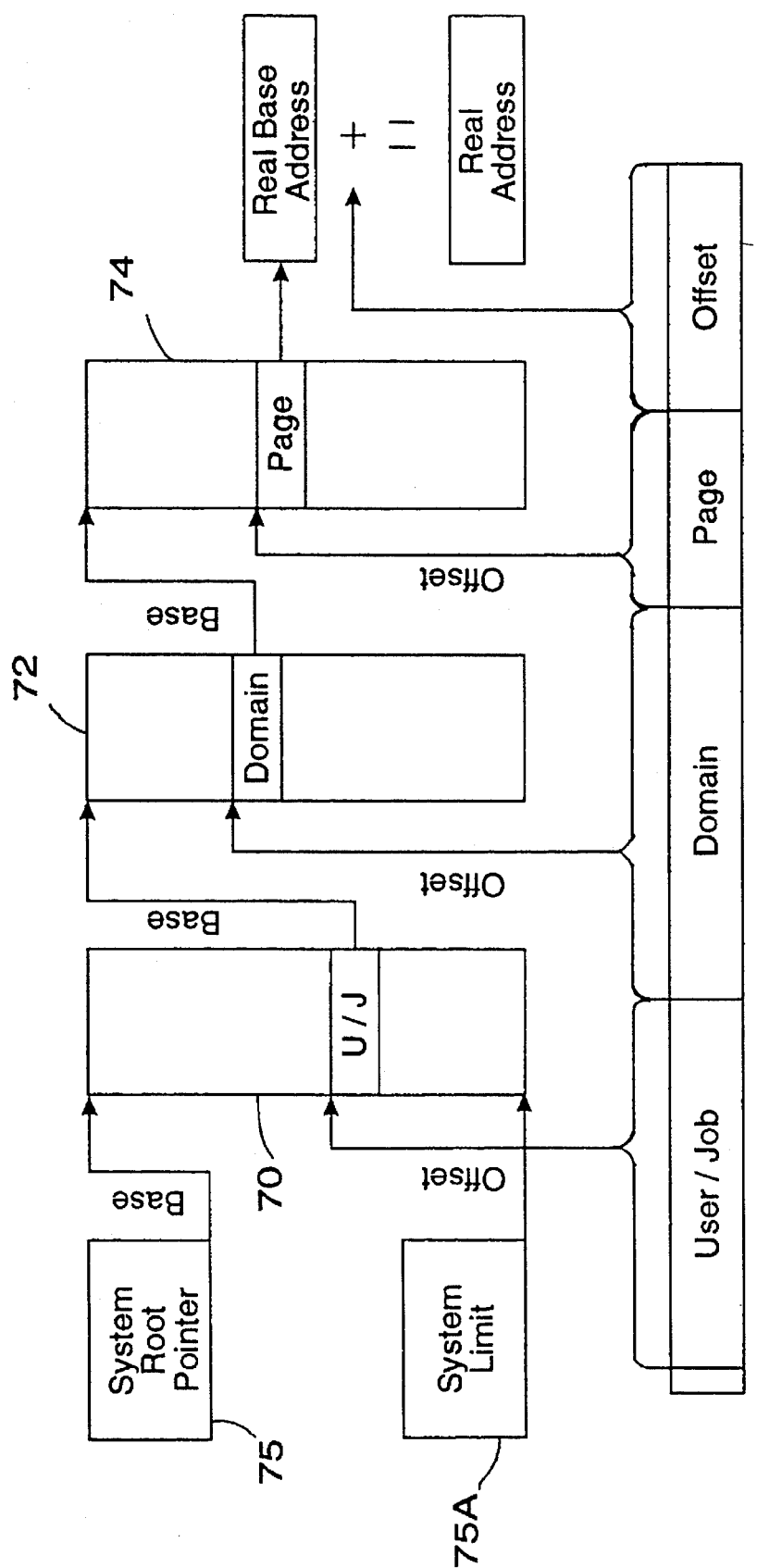
FIG. 4 illustrates the tables according to one embodiment of the present invention.

The tables as shown in FIG. 4, include a user/job table 70 to which the user/job offset information 60 of the descriptor is applied, a plurality of domain tables 72 to which the domain offset information 62 of the descriptor is applied, and a plurality of page tables 74 to which page offset information 64 of the descriptor is applied.

In the present invention, a system root pointer is stored in a system root pointer register 75 in order to point to the base address of the user/job table 70. The maximum allowable offset into the user/job table is located within system limit register 75a. The user/job table 70 includes a plurality of user/job entries with each entry having stored therein a user/job pointer which points to a base address of a domain table, as well as a limit value which specifies the maximum allowable offset into the table. Each of the domain tables includes a plurality of domain entries each having stored therein a domain pointer which points to a base address of a page table, as well as a limit value which specifies the maximum allowable offset into the table. Each of the page tables includes a plurality of pages wherein each page has stored therein a base address of a resource of the data processing system.

Figure 5:
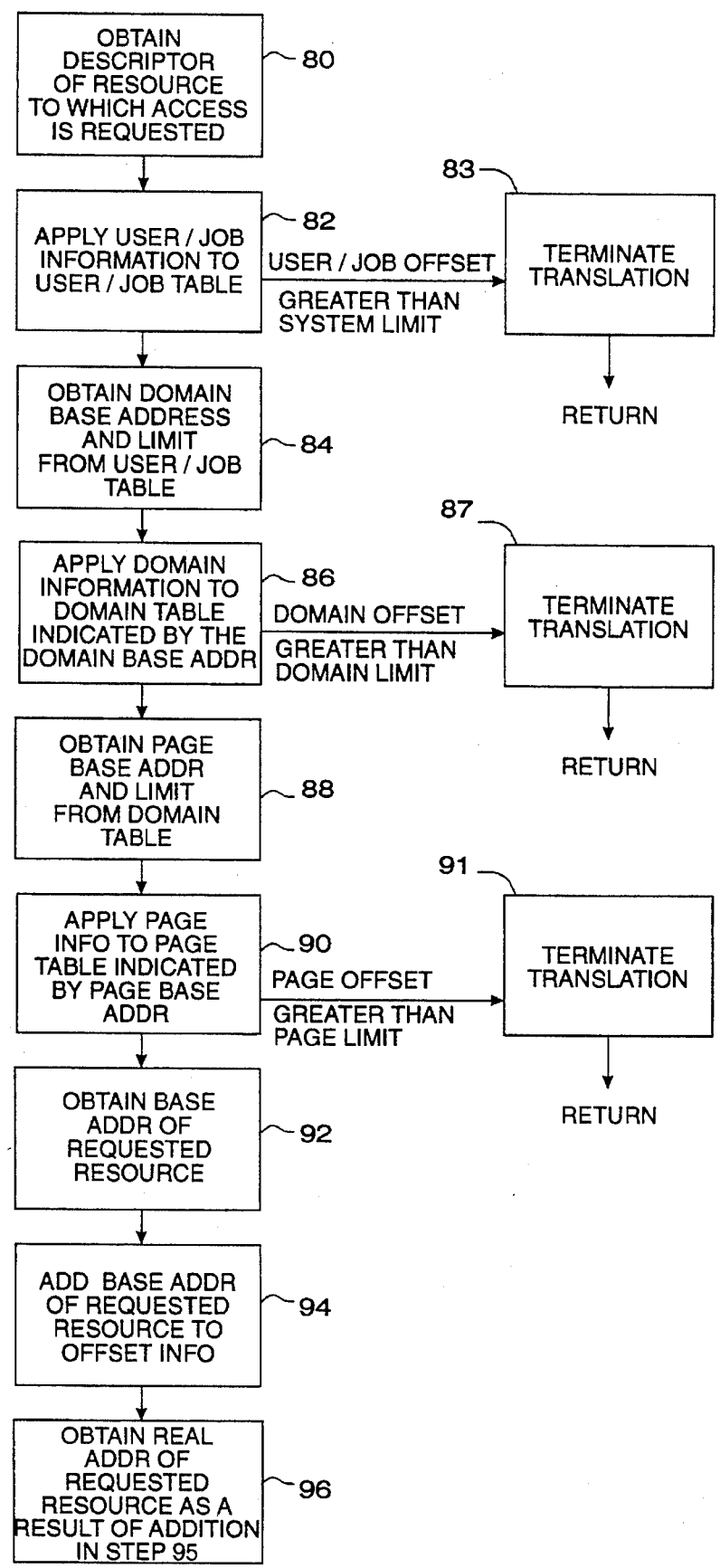
FIG. 5 is a flow chart of the descriptor translation process which makes use of the tables shown in FIG. 4.

FIG. 5 shows a flow chart of the descriptor translation process performed by the descriptor translator module 52a using the tables shown in FIG. 3. Initially, the bus interface monitor 22 detects a request to access a resource not represented by entries in the shadow registers 18. The virtual address of the access request is pushed on the stack by use of the stack pointers 30 and the request is then referred to the secure processor which obtains the descriptor thereof by use of stack pointers 30 (step 80).

Next, if the user/job offset information 60 of the descriptor is not greater than the system limit 75A, then it is applied to the user/job table pointed to by the system root pointer (step 82). Then a base address and limit of a domain table is obtained from the user/job table 70 (step 84). If the domain offset information 62 of the descriptor is not greater than the limit value for the domain, it is applied to the domain table pointed to by the base address in step 84 (step 86). A base address and limit of a page table is then obtained (step 88). Thereafter, if the page offset information 64 is not greater than the limit value, it is applied to the page table identified by the base address of the page table obtained in step 88 (step 90) in order to obtain a base address of the resource to which access is sought (step 92). The base address of the requested resource obtained in step 92 is added to the address offset information 66 (step 94), in order to obtain a real address of the resource to which access is sought (step 96). In steps 82, 84 and 86, if any offset is greater than the corresponding limit value, the descriptor translation process is terminated (steps 83, 87 and 91).

As described above, regarding the shadow registers 18 the results of the descriptor translation process are stored in the shadow register 18. Also, as described above, subsequent descriptor translation processes refer to the shadow register 18 to obtain information resulting from previous descriptor translations that may relate to a current descriptor to be translated. This referring operation eliminates the performance of unnecessary processes in the data processing system, thereby improving the processing speed thereof.

Figure 6:
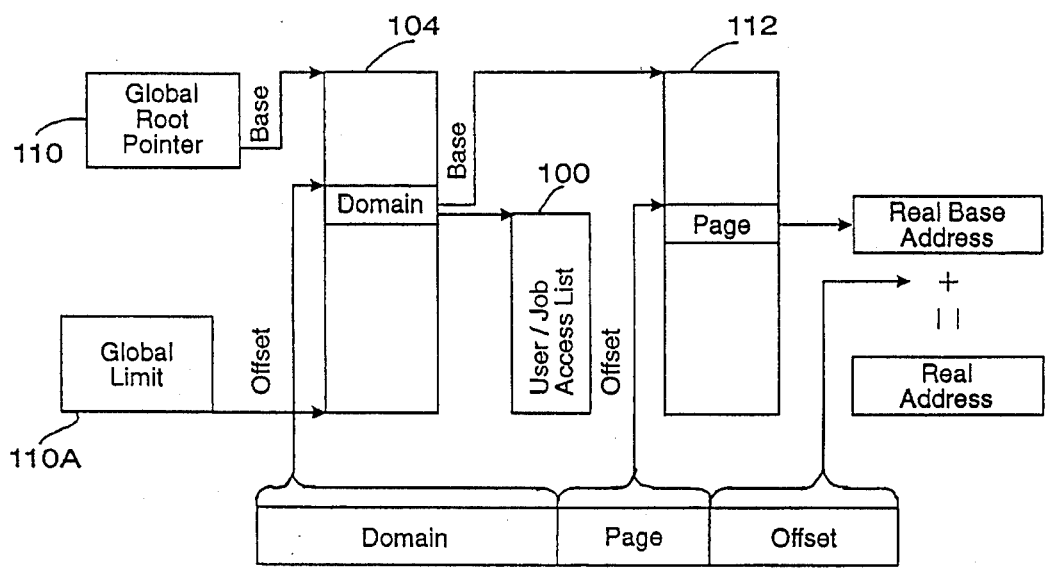
FIG. 6 illustrates the tables of another embodiment of the present invention.
Figure 7:
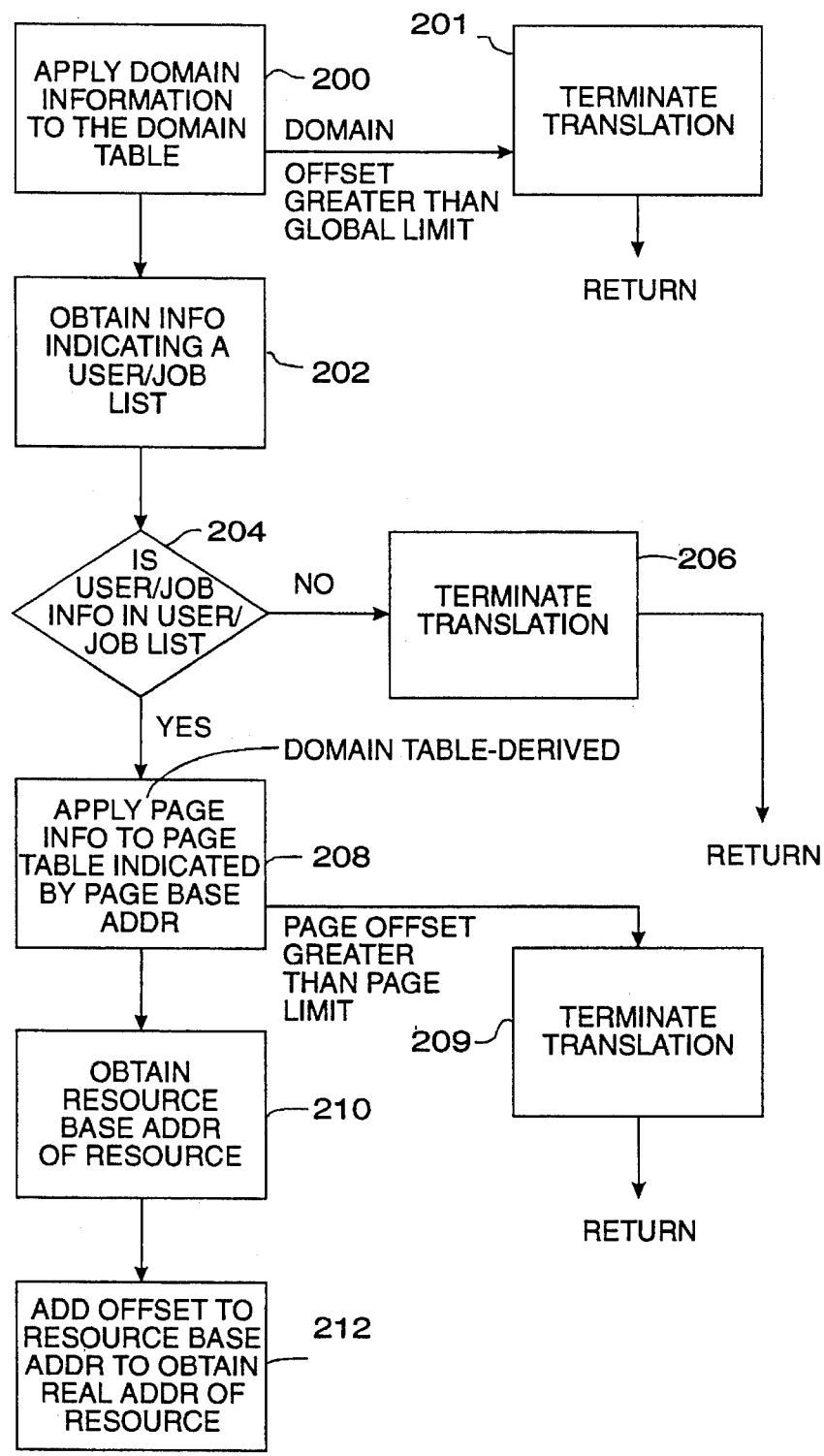
FIG. 7 is a flow chart of the descriptor translation process which makes use of the tables shown in FIG. 7.

Another embodiment of the present invention is shown in FIG. 6. In the tables shown in FIG. 6, the current user/job offset information of the current user/job of the data processing system is prestored in the user/job identification register of the memory management registers 14. This accessing technique is called a global access as described above. This arrangement eliminates the use of the user/job table 70 and replaces it with a user/job access list 100. The process for translating a descriptor by use of the tables shown in FIG. 6, is shown by a flow chart in FIG. 7. To obtain access to a particular resource of the data processing system by use of the tables shown in FIG. 6, the system need only apply the domain offset information 62, the page offset information 64, and the offset information 66 to the tables. A base address of a domain table 104 is pointed to by a domain table pointer stored in a global root pointer register 110 shown in FIG. 6. The maximum allowable offset into the global domain table is located in the global limit register 110A.

If domain offset address information 62 is not greater than the global limit 110A, it is applied to the domain table 104 indicated by the domain table pointer (step 200). A base address and limit of a page table 112 and information indicating a particular user/job access list 100 is obtained from the domain table (step 202). Comparisons are then performed to determine whether the user/job offset information stored in the user/job identification register is listed in the user/job list 100 (step 204). If the user/job information stored in the user/job identification register is not found in the user/job access list 100, then the descriptor translation process is terminated (steps 204 and 206). If the user/job offset information stored in the user/job identification register is found in the user/job access list 100, then the translation proceeds. If the page offset information 64 is not greater than the limit value, it is applied to the page table 112 identified by the page table base address (step 208). A resource base address of a resource is obtained from the page table (step 210) to which is added the offset address information 66 to obtain a real address of the resource to which access is sought (steps 210 and 212). In steps 200 and 208, if any offset is greater than the corresponding limit value, the descriptor translation process is terminated (steps 201 and 209).

By use of the apparatus of the present invention, particularly by use of descriptors which are virtual addresses of resources in the data processing system, the present invention increases the possibility that any penetration of the system can be detected and traced to the perpetrator. In other words, a system log can be kept of all accesses to the resources and all system faults since access to the resources is controlled. Further, for every access entry in the log, the user and job identification and the resource descriptor is recorded. Particularly, the present invention provides for the separation of processor privilege levels from data classifications or clearance levels by the use of user/job tables, domain tables, and page tables.

While the present invention has been described in terms of its preferred embodiments, it should be understood that numerous modifications may be made thereto without departing from the spirit and scope of the invention as defined in the appended claims. For example, the present invention may be used in any application which requires the use of a resource access security system where the inherent disadvantages of conventional data processor security systems is undesired. It is intended that such modifications fall within the scope of the appended claims.

What is claimed is:

1. A resource access security system for controlling access to a data processing system comprising:

a memory in which are stored one or more first tables, each respective first table being associated with a respectively different job/user privilege level and containing a list of domain entries of data processing resources, each domain entry having a respective domain clearance level, the number of domain entries in any first table being independent of the number of domain entries in any other first table, and one or more second tables, each respective second table being associated with a respectively different domain clearance level and containing a respective list of data processing resource entries, the number of data processing resource entries in any second table being independent of the number of entries in any other second table, and wherein each domain entry in said first table contains a pointer code which points to a second table associated with the domain clearance level of said each domain entry; and a data processing system access controller which is operative to enable access to said data processing system in accordance with a prescribed relationship between entries of said first and second tables and a data processing system access code supplied thereto, said data processing access code containing a first component representative of a domain of data processing resources, and a second component representative of a data processing resource to be employed in the course of execution of a data processing task.

2. A resource access security system according to claim 1, wherein said memory further contains one or more lists of user/job entries associated with those users/jobs that have permission to access said data processing system, each domain entry of said first table containing a pointer code which points to a list of user/job entries which have the privilege of accessing said each domain, and said data processing system access controller which is operative to enable access to said data processing system in accordance with whether or not a user/job code representative of a user/job requesting access to said data processing system is associated with a user/job entry in the list of user/job entries pointed to by the pointer code contained in the domain entry represented by the first component of said data processing system access code.

3. A resource access security system according to claim 1, wherein said data processing system access controller is further operative to enable access to said data processing system in dependence upon whether or not the second component of said data processing system access code is representative of a data processing resource contained in the second table that is associated with the domain clearance level of the domain represented by the first component of said data processing system access code.

4. A resource access security system according to claim 3, wherein said memory further contains one or more lists of user/job entries associated with those users/jobs that have permission to access said data processing system, each domain entry of said first table containing a pointer code which points to a list of user/job entries which have the privilege of accessing said each domain, and said data processing system access controller which is operative to enable access to said data processing system in accordance with whether or not a user/job code representative of a user/job requesting access to said data processing system is associated with a user/job entry in the list of user/job entries pointed to by the pointer code contained in the domain entry represented by the first component of said data processing system access code.

5. A resource access security system for controlling access to a data processing system comprising:

a memory in which are stored a first table containing a list of user/job entries associated with those users/jobs that have permission to access said data processing system, each user/job entry having a respective user/job privilege level, one or more second tables, each respective second table being associated with a respectively different user/job privilege level and containing a list of domain entries of data processing resources, each domain entry having a respective clearance level, the number of domain entries in any second table being independent of the number of domain entries in any other second table, and one or more third tables, each respective third table being associated with a respectively different domain clearance level and containing a respective list of data processing resource entries, the number of data processing resource entries in any third table being independent of the number of entries in any other third table, and wherein each user/job entry in said first table contains a pointer code which points to a second table that is associated with the user/job privilege level of said each user/job entry, and each domain entry in said second table contains a pointer code which points to a third table that is associated with the domain clearance level of said each domain entry; and a data processing system access controller which is operative to enable access to said data processing system in accordance with a prescribed relationship between entries of said first, second and third tables and a data processing system access code supplied thereto, said data processing access code containing a first component representative of a user/job, a second component representative of domain of data processing resources, and a third component representative of a data processing resource to be employed in the course of execution of a data processing task.

6. A resource access security system according to claim 5, wherein said data processing system access controller is operative to enable access to said data processing system in dependence upon whether or not said first component is representative of a user/job contained in said first table.

7. A resource access security system according to claim 6, wherein said data processing system access controller is operative to enable access to said data processing system in dependence upon whether or not the second component of said data processing system access code is representative of a domain contained in the second table that is associated with the privilege level of the user/job represented by the first component of said data processing system access code.

8. A resource access security system according to claim 7, wherein said data processing system access controller is operative to enable access to said data processing system in dependence upon whether or not the third component of said data processing system access code is representative of a data processing resource contained in the third table that is associated with the clearance level of the domain represented by the second component of said data processing system access code.

9. A method of controlling access to a data processing system comprising the steps of:

(a) storing, in memory,
   i—one or more first tables, each respective first table being associated with a respectively different job/user privilege level and containing a list of domain entries of data processing resources, each domain entry having a respective clearance level, the number of domain entries in any first table being independent of the number of domain entries in any other first table, and
   ii—one or more second tables, each respective second table being associated with a respectively different clearance level and containing a respective list of data processing resource entries, the number of data processing resource entries in any second table being independent of the number of entries in any other second table, and wherein
   each domain entry in said first table contains a pointer code which points to a second table associated with the domain clearance level of said each domain entry;

(b) generating a data processing system access code containing a first component representative of a domain of data processing resources, and a second component representative of a data processing resource to be employed in the course of execution of a data processing task; and (c) enabling access to said data processing system in accordance with a prescribed relationship between said data processing system access code and entries of said first and second tables.

10. A method according to claim 9, wherein step (a) further includes storing one or more lists of user/job entries associated with those users/jobs that have permission to access said data processing system, each domain entry of said first table containing a pointer code which points to a list of user/job entries which have the privilege of accessing said each domain, step (b) further comprises generating a user/job code representative of a user/job requesting access to said data processing system, and step (c) further comprises enabling access to said data processing system in accordance with whether or not said user/job code is associated with a user/job entry in the list of user/job entries pointed to by the pointer code contained in the domain entry represented by the first component of said data processing system access code.

11. A method according to claim 9, wherein step (c) further comprises enabling access to said data processing system in dependence upon whether or not the second component of said data processing system access code is representative of a data processing resource contained in the second table that is associated with the domain clearance level of the domain represented by the first component of said data processing system access code.

12. A method according to claim 11, wherein step (a) further includes storing one or more lists of user/job entries associated with those users/jobs that have permission to access said data processing system, each domain entry of said first table containing a pointer code which points to a list of user/job entries which have the privilege of accessing said each domain, step (b) further comprises generating a user/job code representative of a user/job requesting access to said data processing system, and step (c) further comprises enabling access to said data processing system in accordance with whether or not said user/job code is associated with a user/job entry in the list of user/job entries pointed to by the pointer code contained in the domain entry represented by the first component of said data processing system access code.

13. A method of controlling access to a data processing system comprising the steps of:

(a) storing, in memory,
   i—a first table containing a list of user/job entries associated with those users/jobs that have permission to access said data processing system, each user/job entry in said first table having a respective user/job privilege level,
   ii—one or more second tables, each respective second table being associated with a respectively different user/job privilege level and containing a list of domain entries of data processing resources, the number of domain entries in any second table being independent of the number of domain entries in any other second table, each domain entry in a second table having a respective domain clearance level, and
   iii—one or more third tables, each respective third table being associated with a respectively different domain clearance level and containing a respective list of data processing resource entries, the number of data processing resource entries in any third table being independent of the number of entries in any other third table, and wherein
   each user/job entry in said first table contains a pointer code which points to a second table that is associated with the user/job privilege level of said each user/job entry, and each domain entry in said second table that is associated with the user/job privilege level of said each user/job entry contains a pointer code which points to a third table that is associated with the domain clearance level of said each domain entry;

(b) generating a data processing system access code containing a first component representative of a user/job, a second component representative of domain of data processing resources, and a third component representative of a data processing resource to be employed in the course of execution of a data processing task; and (c) enabling access to said data processing system in accordance with a prescribed relationship between said data processing system access code and entries of said first, second and third tables.

14. A method according to claim 13, wherein step (c) comprises enabling access to said data processing system in dependence upon whether or not said first component is representative of a user/job contained in said first table.

15. A method according to claim 14, wherein step (c) further comprises enabling access to said data processing system in dependence upon whether or not the second component of said data processing system access code is representative of a domain contained in the second table that is associated with the privilege level of the user/job represented by the first component of said data processing system access code.

16. A method according to claim 15, wherein step (c) further comprises enabling access to said data processing system in dependence upon whether or not the third component of said data processing system access code is representative of a data processing resource contained in the third table that is associated with the clearance level of the domain represented by the second component of said data processing system access code.

* * * * *